Aug. 4, 1942.    V. DE SANTRO ET AL    2,292,210
WHEEL MOUNTING AND DRIVING MEANS
Filed June 27, 1941    2 Sheets-Sheet 1
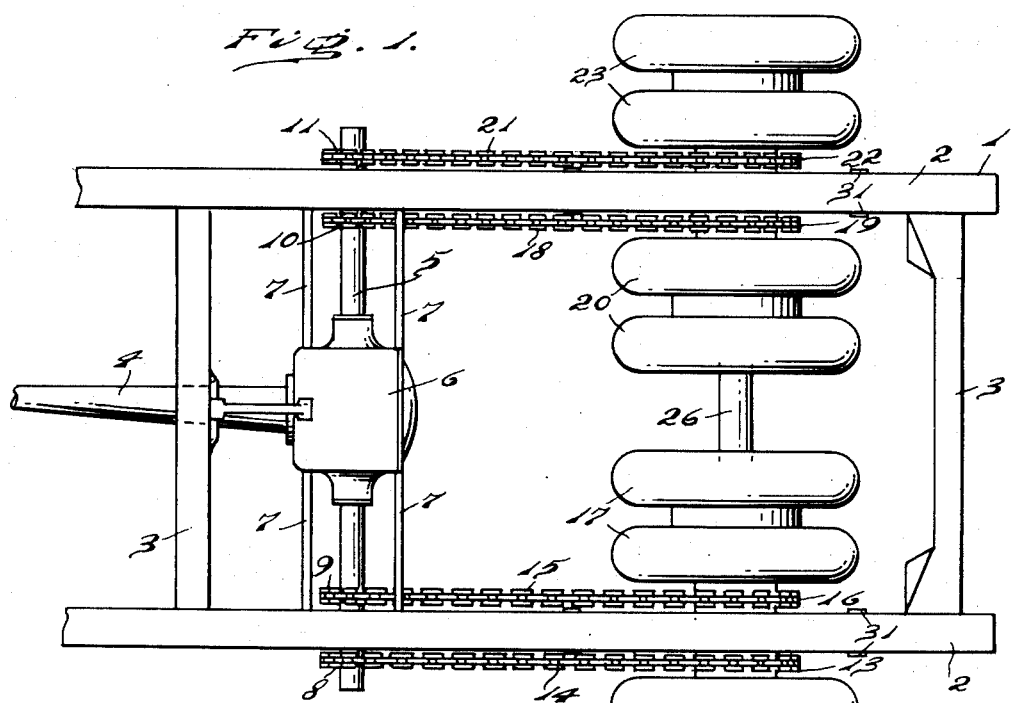
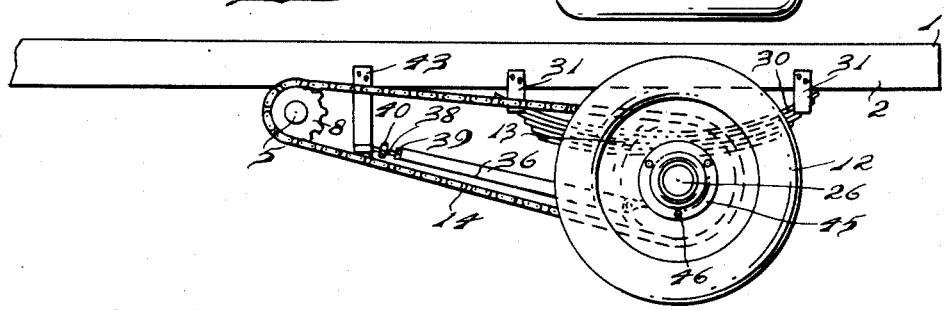
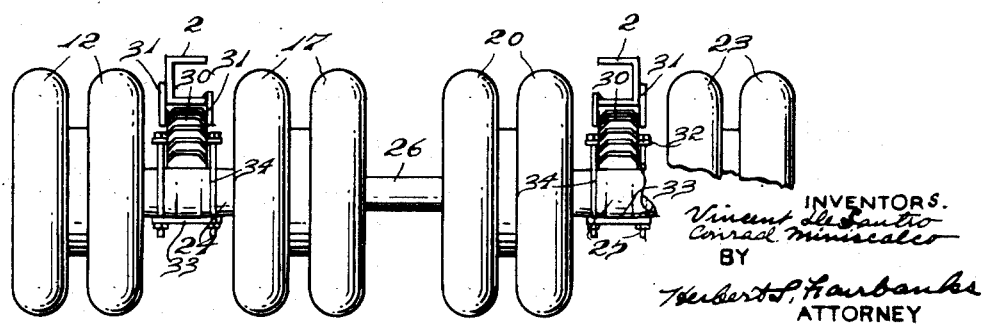
INVENTORS.
Vincent De Santro
Conrad Miniscalco
BY
Herbert S. Fairbanks
ATTORNEY Aug. 4, 1942. V. DE SANTRO ET AL 2,292,210

WHEEL MOUNTING AND DRIVING MEANS

Filed June 27, 1941 2 Sheets-Sheet 2

INVENTORS.
Vincent De Santro
Conrad Minnicalco
BY
Herbert S. Fairbanks
ATTORNEY

Patented Aug. 4, 1942

2,292,210

UNITED STATES PATENT OFFICE 2,292,210

WHEEL MOUNTING AND DRIVING MEANS

Vincent De Santro and Conrad Miniscalco, Philadelphia, Pa.

Application June 27, 1941, Serial No. 399,988

6 Claims. (Cl. 180—22)

One object of our present invention is to devise novel means to increase the supporting capacity of a motor driven truck.

A further object of the invention is to devise novel means for mounting a plurality of sets of dual wheels, with provision for driving each set. Two sets of dual wheels are located within the side channels of the frame, and two sets are located exterior of the side channels. The mounting is constructed in such a manner that, in case of deflation of a tire, a set can be removed and replaced in a minimum of time and with a minimum amount of labor.

A further object of the invention is to devise a novel construction and arrangement of tubular bearings with which a shaft is removably connected and interlocked.

A further object of the invention is to devise a novel suspension for the bearings and shaft and novel means for maintaining their proper alignment with respect to the frame or chassis of the truck.

With the above and other objects in view as will hereinafter clearly appear, our invention comprehends a novel wheel mounting and drive.

It further comprehends novel mounting means for dual wheels and novel driving means; novel means for maintaining proper alignment of the wheels; and a novel construction and arrangement of bearings and shaft, whereby the shaft can be moved out of a bearing to provide space for the removal of the sets of wheels within the frame.

Other novel features of construction and advantage will hereinafter appear in the detailed description and the appended claims.

For the purpose of illustrating the invention, we have shown in the accompanying drawings, a preferred embodiment of it which will give in practice satisfactory and reliable results. It is however to be understood that this embodiment is typical only and that the various instrumentalities of which the invention consists can be variously arranged and organized and the invention is not limited to the exact arrangement and organization of these instrumentalities as herein set forth.

Figure 1 is a top plan view showing, in conjunction with a truck, chassis wheel mounting and driving means, embodying our invention.

Figure 2 is a side elevation.

Figure 3 is a rear elevation.

Similar numerals indicate corresponding parts.

Referring to the drawings—

Figure 4:
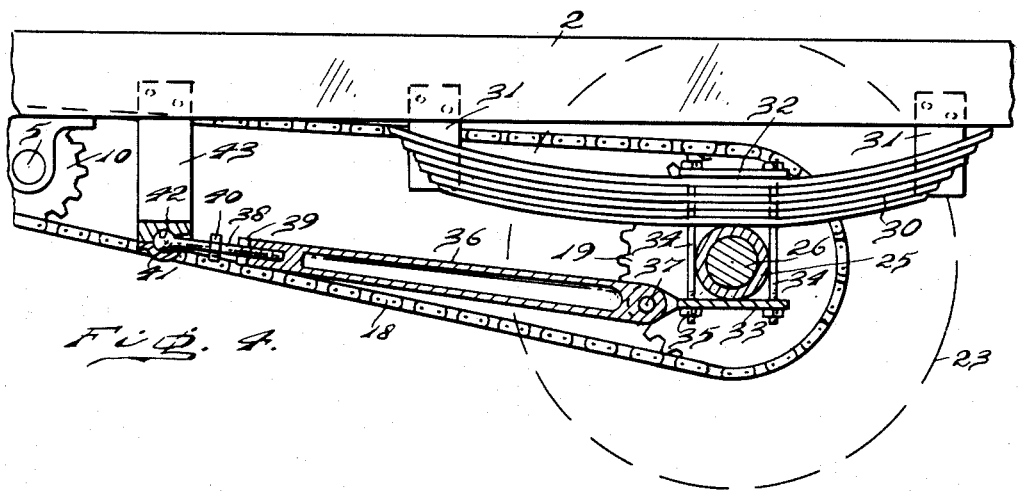
Figure 4 is a sectional elevation, on an enlarged scale.
Figure 5:
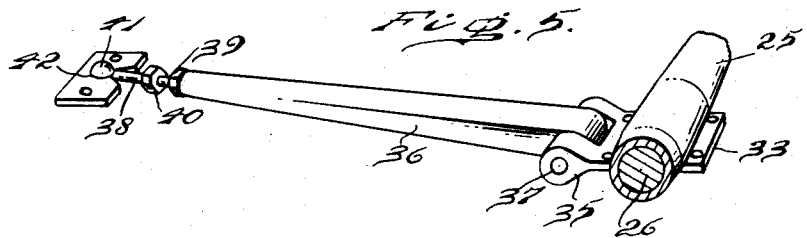
Figure 5 is a perspective view, showing more particularly aligning mechanism for the wheels.
Figure 6:
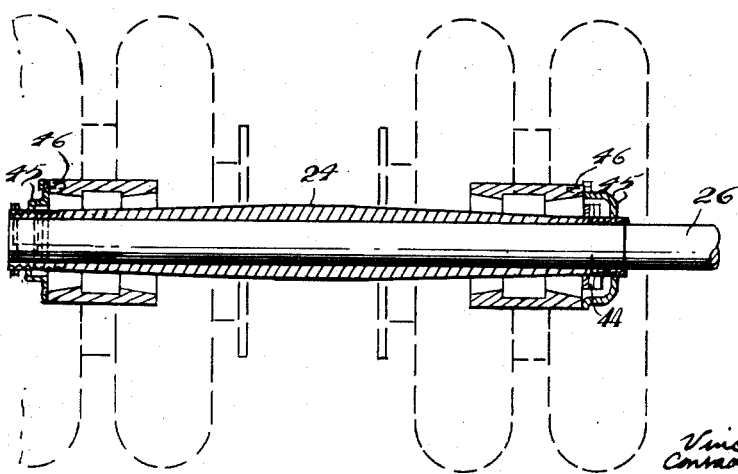
Figure 6 is a sectional view of a bearing and its adjuncts.
Figure 7:
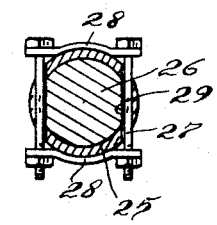
Figure 7 is a section of the axle and a bearing, with means to secure them in fixed relation.

1 designates a truck chassis of any desired or conventional type, having side members 2 with conventional cross braces 3. The engine driven shaft 4 is intergeared with a counter-shaft 5, carried by the transmission housing 6, which latter is supported by cross bars 7, fixed to the side members 2. The counter-shaft 5 has fixed on it in spaced relation the sprocket wheels 8, 9, 10 and 11, the sprocket wheels 9 and 10 being inboard of the side members 2, and the sprocket wheels 8 and 11 being outboard of the side members 2. A set 12 of dual wheels has a sprocket wheel 13 driven by a sprocket chain 14, driven from the sprocket wheel 8. A sprocket chain 15 driven from the sprocket wheel 9 drives a sprocket wheel 16 fixed to a set 17 of dual wheels inboard of the side members 2. A sprocket chain 18 driven from the sprocket wheel 10 drives a sprocket wheel 19 fixed to a set 20 of dual wheels, inboard of the side members 2. A sprocket chain 21 driven from the sprocket wheel 11 drives a sprocket wheel 22 fixed to a set 23 of dual wheels outboard of the juxtaposed side member 2. It will thus be clear that we provide two sets of dual wheels inboard of the chassis and two sets of dual wheels outboard of the chassis, and each set is independently driven. The sets 12 and 17 are mounted on a tubular bearing 24, and the sets 20 and 23 are mounted on a tubular bearing 25. An axle 26 has a driving fit in the two bearings, and is locked at its outer ends to the bearings by bolts and nuts 27, which pass through clamping brackets 28 and through apertures 29 in the bearings and axle. When the bolts are removed, the axle can be driven longitudinally through a bearing, and the juxtaposed inner ends of the bearings are spaced a sufficient distance apart to permit an inboard set of wheels to be removed or replaced, when it becomes necessary to repair a deflated tire. The bearings have springs 30 fixed to them, and the free ends of the upper leaves of the springs are in sliding engagement with the bottom of their respective side member 2. Lateral movement of the springs is prevented by depending arms 31 riveted, bolted or welded to the side members. The springs may be fixed to the bearings in any desired manner, and, as shown, upper and lower plates 32 and 33, respectively, are fixed in position by bolts and nuts 34. Each lower plate 33 has a forwardly extending, bifurcated enlargement 35 to which bars or rods 36 are secured by pivot pins 37. The bars 36 have rods 38 in threaded engagement with them, and fixed in adjusted position by nuts 39. The rods 38 have a non-circular portion 40 to receive a working tool to turn them, and the free ends of the rods 38 terminate in balls 41, received in ball sockets 42, carried by brackets 43, fixed by bolting, riveting or welding to the side members 2 of the chassis.

The sets of dual wheels have conventional roller bearings to engage the tapered surfaces of the bearings 24 and 25, and any desired or conventional means can be employed to retain the wheels on their bearings 24 and 25. As shown, nuts 44 are in threaded engagement with the bearings to bear against the conventional cones of the wheels. Grease retainers 45 in the form of recessed rings are secured to the wheels by fastening devices 46.

It will be apparent that upon removal of the grease retainers and the bolts 27, the axle 26 can be driven through a bearing 24 or 25, so that, upon removal of a nut 44, a selected set of dual wheels can be removed or replaced.

By adjusting the rods 38, the axle 26 can be positioned for the proper alignment of the wheels with the chassis.

Having thus described our invention, what we claim as new and desire to secure by Letters Patent is:

1. In a device of the character described, the combination with a truck chassis having side members, of tubular bearings, springs connecting the bearings with the chassis, an axle longitudinally slidable in said bearings, means to lock together the bearings and axle, a set of dual wheels mounted on each bearing inwardly of the side members, a set of dual wheels mounted on each bearing outwardly of the side members, and means to drive each set of wheels.

2. In a device of the character described, the combination with a truck chassis having side members, of tubular bearings having their inner ends spaced from each other, springs operatively connecting the bearings with said side members, an axle longitudinally slidable in said bearings, means to lock together said bearings and axle, a set of dual wheels mounted on each bearing inwardly of a juxtaposed side member, a set of dual wheels mounted on each bearing outwardly of a juxtaposed side member, the spacing between said bearings permitting the removal and replacement of a selected inner set of wheels on longitudinal movement of said axle, and driving means for each set of wheels.

3. In a device of the character described, a truck chassis having side members, tubular bearings, springs connected with said bearings and having their free ends in sliding engagement with said side members, a wheel on each bearing inwardly of a side member, a wheel on each bearing outwardly of a side member, an axle passing through and removable from said bearings, means cooperating with the chassis and bearings to maintain alignment of the wheels, and driving means for said wheels.

4. In a device of the character described, the combination with a truck chassis, of tubular bearings, springs connected with the bearings and in sliding engagement with the chassis, longitudinally adjustable aligning members connected with the bearings and the chassis, an axle slidable through the bearings, means to secure the axle and bearings in fixed relation, sets of wheels on the bearings inwardly of and outwardly of the chassis, and driving means for each set of wheels.

5. In a device of the character described, a chassis, an engine driven transmission carried by the chassis and having a shaft extending beyond the sides of the chassis, a set of wheels outboard of each side of the chassis and independently driven from said shaft, a set of wheels inboard of the side members of the chassis and independently driven from said shaft, spaced bearings for said wheels, springs fixed to said bearings and in sliding engagement with said chassis, and longitudinally adjustable connections between the chassis and bearings to maintain alignment of the wheels with the chassis.

6. In a wheel mounting, a plurality of spaced tubular bearings, each having tapered surfaces to receive two sets of dual wheels, an axle having a driving fit in said bearings and passing through them, means to lock together said axle and bearings, and means to secure said sets of wheels on their bearings, the spacing between said bearings permitting the removal or replacement of the inner sets of wheels from said bearings.

VINCENT DE SANTRO.
CONRAD MINISCALCO.